United States Patent [19]
Van Acker

[11] 3,830,389
[45] Aug. 20, 1974

[54] AUTO TOP BOAT LOADER AND CARRIER

[76] Inventor: John J. Van Acker, 12910 Lynn Ave., Chesterland, Ohio 44026

[22] Filed: Aug. 16, 1973

[21] Appl. No.: 389,001

[52] U.S. Cl. .......................... 214/450, 224/42.1 H
[51] Int. Cl. ................................................ B60r 9/00
[58] Field of Search .. 214/450; 224/42.1 H, 42.1 G, 224/42.1 R

[56] References Cited
UNITED STATES PATENTS
| | | | |
|---|---|---|---|
| 2,600,082 | 6/1952 | Sumner | 224/42.1 H |
| 2,834,491 | 5/1958 | Wells | 214/450 |
| 3,155,257 | 11/1964 | Showler | 214/450 |

*Primary Examiner*—Robert J. Spar
*Assistant Examiner*—John Mannix

[57] ABSTRACT

An attachment for use with conventional auto top utility carriers to facilitate one-man loading and unloading of a boat onto and from the top of an auto. The attachment includes universal pivital support means mounted on the utility carrier for receiving the gunwales of the boat and clamping means for securely retaining the boat in a bottom-up loaded position on the auto top. Guide means are provided for steadying the boat during the loading or unloading operation and, optionally, the guide means may be in the form of a platform for storing articles thereon in a protected position under the boat loaded on the auto top. Pivot means are provided on one side of the carrier to permit lifting one side of the boat in loaded position to permit access to the platform.

4 Claims, 5 Drawing Figures

PATENTED AUG 20 1974　　3,830,389
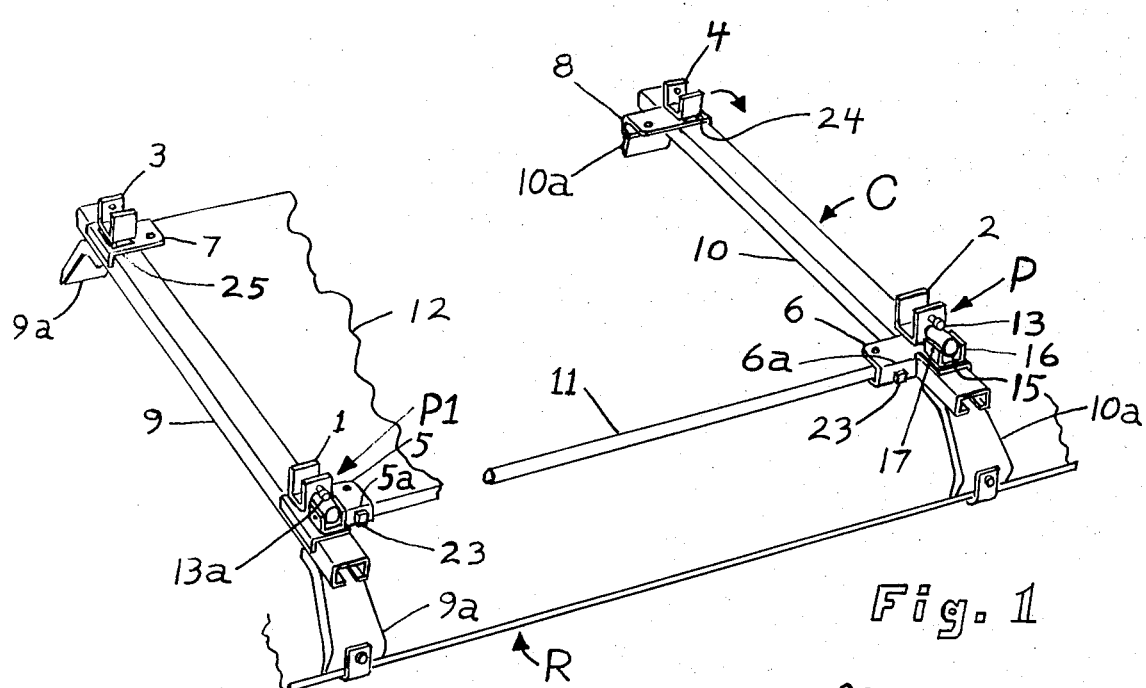
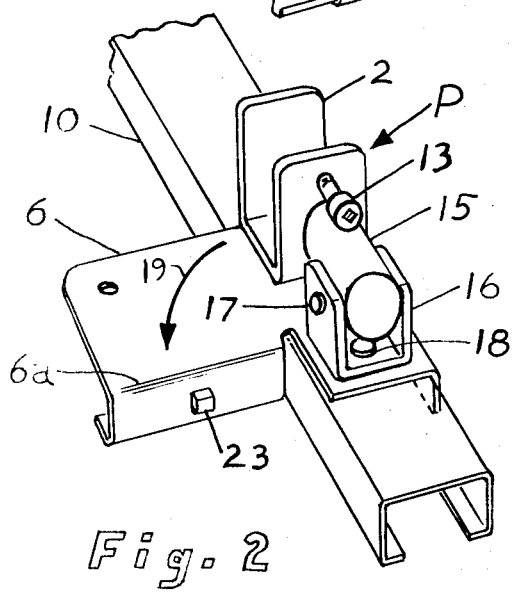
Fig. 2
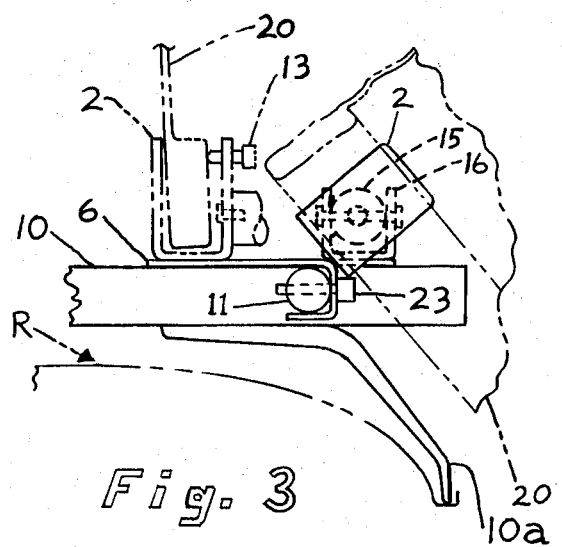
Fig. 3
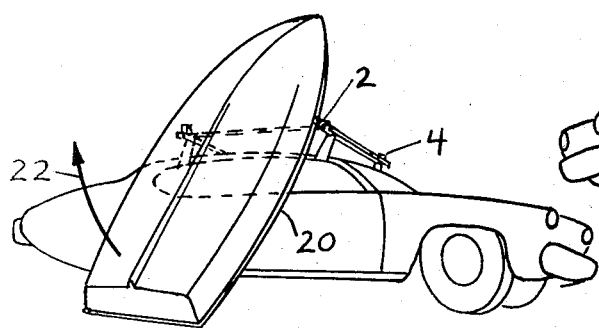
Fig. 4
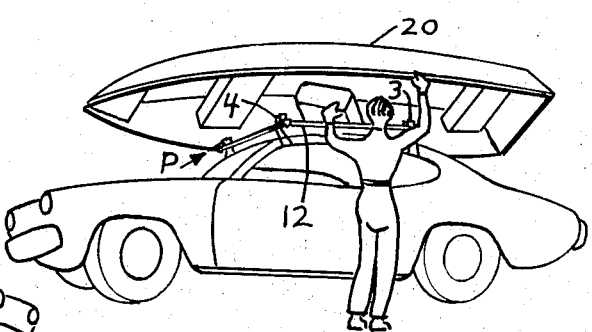
Fig. 5

AUTO TOP BOAT LOADER AND CARRIER

BACKGROUND OF THE INVENTION

Present day auto boat loaders and carriers are primarily directed to devices which attach to the rear bumper of an auto. Such devices are extensively used in the transportation of small boats and permit one-man loading by lifting the stern of the boat to a clamping device mounted high above, and from, the rear bumper. These devices do not aid in obtaining a mechanical advantage in lifting and cause interference with trailer hitches and station wagon tail gates. Loading and unloading operations can only be performed from the rear of the auto requiring a full 180° movement of the boat to position it in the proper location on the auto top. Trailers, therefore, can not be attached to an auto while loading or unloading a boat with present day auto boat loaders. Other boat loaders and carriers do not have the ability to carry or provide access for carrying motors or luggage under the boat while on the auto top.

SUMMARY OF THE INVENTION

The present invention provides an attachment to permit one-man loading and unloading of a boat onto and from an auto roof, the loading and unloading operations being carried out from a position from the side of the auto.

An object of the invention is to provide an auto top boat loader and carrier adapted for one-man operation without creating and undue strain or hazards to the operation.

Another object of the invention is to provide a pivotal support and a guide means affording a mechanical advantage, by transmitting a large portion of the weight of the boat to the auto and without scratching or damaging the auto, to aid a single operator in the loading and unloading of the boat.

Another object of the invention is to provide releasable clamping means for securely retaining the boat against movement when clamped, and readily releasable when desired for unloading the boat from the auto top carrier.

Another object of the invention is to provide an auxiliary rack or platform for storing articles, luggage and the like, such when the boat is securely positioned bottom-up on the auto top, the boat will serve as a protective cover for the articles on the platform.

The foregoing objects and advantages are attained by providing an attachment including universally pivotable support means mounted on a pair of cross rails of a conventional auto top utility carrier. Guide means are associated with the attachment for guiding the boat into a loading position, from the side of the boat, by leaning the boat (bottom-up) in an upright position against the guide means with the gunwales of the boat in alignment with the support means. In this position, the bow of the boat is lifted so that the gunwale at one side is positioned in the support means where it is secured by a clamping means. The stern of the boat is then further lifted and pivoted 90° so as to center the boat on the auto top, and the gunwales on both sides of the boat are positioned in the support means and clamped therein to rigidly hold the boat against movement on the carrier.

In the drawing:

FIG. 1 illustrates the auto top boat loader and carrier of the present invention, mounted on a conventional auto top utility carrier, and an auxiliary platform partially broken away;

FIG. 2 is a detailed view of a universally pivotal support and a clamping means in the position it would assume when retaining a boat on the auto top;

FIG. 3 is a side view of the pivotal support of FIG. 2 shown in a position to receive the boat for loading, and showing in phantom a portion of the boat both in the receiving position and a loaded position;

FIG. 4 shows the initial position of the boat relative to the auto prior to final loading of the boat on the carrier; and FIG. 5 shows how the boat on the auto top may be lifted about pivots to provide access to the auxiliary platform.

DESCRIPTION OF THE PREFERRED EMBODIMENT

With reference to FIG. 1, there is shown a conventional auto top utility carrier indicated generally by the reference character C. The carrier C includes a pair of parallel cross rails 9 and 10 extending in a direction transverse to the auto, and each cross rail 9 and 10 is secured at its ends to a pair of corner mounts 9a and 10a respectively, for mounting the carrier C on an auto roof or top R.

The cross rail 10 is provided at one end with a flanged bracket 6 fixed thereon, and a universally pivotable support indicated at P attached to the bracket 6. As shown in FIG. 2, the support comprises a U-shaped clamp 2 pivotally supported at one end of a connector rod 15. The other end of the connector rod 15 is supported for transaxial pivotal movement on a pin 17 supported in a pivot member 16, and the pivot member 16 is pivotally mounted at 18 to the bracket 6 and the cross rail 10.

Thus, pivotal movement of the pivot member 16, in a counterclockwise direction as viewed in FIG. 2, rotates the clamp 2 to a position 90° from the position of FIG. 2, through the connector rod 15, in a direction of an arrow 19 to thereby position the clamp 2 at an edge 6a of the bracket 6. In this position, the clamp 2 may be pivoted downwardly about the connector rod 15 and against a stop 23 on the bracket 6 to position the clamp 2 in a boat loading or unloading position as shown in FIG. 3.

The cross rail 9 is also provided with a support P1 (FIG. 1), similar to the support P on the cross rail 10, mounted on the end of the cross rail 9 so as to be on the same side of the auto top R as the support P provided on the cross rail 10.

The support P1 of the cross rail 9 includes a connector rod, a pivot member and a stop as described above regarding support P, as well as a clamp 1 and a flanged bracket 5. The bracket 5 extends outwardly from the cross rail 9 in a direction towards the extension of the bracket 6 supporting the clamp 2. As shown in FIG. 1, a guide bar 11 is mounted in the brackets 5 and 6 for supporting and guiding the boat in an upright position during loading and unloading of the boat onto and from the auto top R.

While the supports P, P1 of both of the cross rails 10 and 9 respectively, are identical in construction and operation, the clamp 1 is adapted to be pivoted in a clockwise direction adjacent an edge 5a of the bracket 5, and the clamp 2 is adapted to be pivoted in a counterclockwie direction to the edge 6a of the bracket 6 (both as viewed in FIG. 1) to position the clamps 1 and 2 in loading and unloading positions.

The other end of the cross rail 9 is provided with a bracket 7 fixed thereto. A clamp 3 is mounted on the bracket 7 and is hinged at 25 to permit the clamp 3 to be lowered below the level of the cross rail 9 as will be further explained hereinafter.

The other end of the cross rail 10 is provided with a similar arrangement to that of cross rail 9 and includes a bracket 8 secured thereto. A clamp 4 is mounted on the bracket 8 and is hinged at 24. The bracket 8 extends outwardly from the cross rail 10 in a direction towards the extension of the bracket 7.

In place of the guide bar 11, the attachment may be provided with an auxiliary platform 12, shown in FIG. 1, supported by the brackets 5, 6, 7 and 8. The platform 12 provides the same support and guiding functions as the guide bar 11 described above and, also, provides for the storage of luggage and other articles thereon.

In the operation of the attachment, a boat 20 is placed on the ground alongside the auto, bottom-up, with the stern of the boat about even with the clamp 2. With the clamp 2 pivoted to the position shown in FIG. 3, the bow of the boat is raised and rotated on the stern corner to lean the boat in an upright position against the guide bar 11 (or the edge of the platform 12) as shown in FIG. 4.

Thus positioned, the gunwale of one side of the boat is received in the clamp 2 as shown in FIG. 3, and is secured in the clamp by a fastener 13. The stern of the boat is then raised in the direction of arrow 22 in FIG. 4, causing the clamp 2 to pivot about the connector rod 15 and thus position the clamp 2 on the bracket 6 adjacent the edge 6a.

At this point the stern of the boat is rotated in a clockwise direction as viewed in FIG. 4, as permitted by the pivot member 16 pivoting about 18. During this portion of the loading operation, the clamps 3 and 4 are manually swung downwardly about their hinges 25 and 24 respectively, to thereby avoid being an obstacle in the loading operation of the boat.

With the boat 20 on the auto top carrier, the rear gunwale is positioned in the clamp 1 and is secured by fastening means 13a. At the other side of the auto, the clamps 3 and 4 are returned to their raised positions about the hinges 25 and 24 and the gunwale is positioned in the clamps 3 and 4 and secured by fastening means (not shown) to thereby firmly hold the boat on the carrier without need for any tie ropes or the like.

It will be appreciated, unloading the boat from the auto top carrier is accomplished in reverse manner to the loading operation described hereinabove.

FIG. 5 illustrates the manner in which the boat 20 may be pivoted and raised upwardly from the roof to permit access to the articles in the platform 12. Thus, by releasing the fastening means associated with the clamps 3 and 4, the boat may be raised and pivoted about the pivot 17 of the clamps 1 and 2. This raising of the boat does not disturb the position of the boat on the carrier and, therefore, after placing or removing an article on or from the platform 12, the boat may be lowered with the gunwales in alignment with the clamps and again secured to the carrier for transporting the boat on the auto top.

From the foregoing, it will be seen that the present invention provides a simple but reliable device to aid a single operator in loading and unloading a boat onto and from an auto top. The attachment can be adapted to standard type auto top utility carriers, and provides for securely retaining the boat against movement while in transport without resort to and supplimental securing means and/or assist mechanisms attached to other parts of the vehicle.

I claim:

1. An auto top boat loader and carrier device for use with an auto top utility carrier providing a pair of cross rails secured to the auto top and extending transversely thereto, the device comprising:

a first bracket secured on each said cross rail adjacent the end thereof at one side of the auto top, each said first bracket having a first flange extending outwardly therefrom in opposed relationship;

a pivot member on each said first bracket pivotally movable between a first and a second position;

connector means associated with each said pivot member and supported thereon for transaxial pivotal movement;

a first clamp pivotally mounted on each said connector means for movement between an inclined boat loading position against the first flange when the pivot member is in the second position, and movable to a boat loaded position on the first bracket when the pivot member is moved to the first position;

stop means on each said first flange for maintaining each said first clamp in the inclined boat loading position;

guide means mounted on the first brackets for supporting the boat during a loading operation thereof; and fastening means on each said first clamp for securing the boat in the loaded position;

whereby each said first clamp when in the boat loading position receives the gunwales of the boat as the boat is being raised to the auto top and thereafter is pivoted to the first position of the pivot member to place the boat in a loaded position on the auto top.

2. A device as set forth in claim 1 which further comprises:

a second bracket associated with each of the cross rails and secured thereto adjacent the end of the cross rail at the other side of the auto top, each said second bracket having a second flange extending outwardly therefrom in opposed relationship;

a second clamp hinged on each of the second brackets for movement between a raised and a lowered position; and fastening means on each said second clamp for securing the boat in the loaded position;

whereby each said second clamp is moved to its lowered position to avoid interference during a boat loading operation and is moved to its raised position for retaining the boat in the loaded position on the auto top.

3. A device as set forth in claim 2 in which the guide means includes a platform supported by the first and the second brackets.

4. A device as set forth in claim 3 wherein in response to lifting the side of the boat normally retained by the second clamps causes the first clamps to pivot to the inclined position to thereby provide access to the platform on the auto top.

* * * * *